(12) United States Patent
Pitzen

(10) Patent No.: US 10,455,809 B2
(45) Date of Patent: *Oct. 29, 2019

(54) CONFORMABLE AND REUSABLE LICK DETERRENT

(71) Applicant: Mark L. Anderson, Spring Valley, WI (US)

(72) Inventor: James F. Pitzen, Stillwater, MN (US)

(73) Assignee: Mark L. Anderson, Spring Valley, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/998,592

(22) Filed: Aug. 16, 2018

(65) Prior Publication Data

US 2018/0359995 A1 Dec. 20, 2018

Related U.S. Application Data

(60) Continuation of application No. 15/363,017, filed on Nov. 29, 2016, now Pat. No. 10,070,620, and a continuation of application No. 14/195,212, filed on Mar. 3, 2014, now Pat. No. 9,504,232, and a division of application No. 12/695,238, filed on Jan. 28, 2010, now Pat. No. 8,695,538.

(51) Int. Cl.
*A01K 13/00* (2006.01)
*A01K 15/02* (2006.01)

(52) U.S. Cl.
CPC ............ *A01K 13/006* (2013.01); *A01K 15/02* (2013.01); *A01K 15/029* (2013.01)

(58) Field of Classification Search
CPC ...... A01K 13/00; A01K 13/006; A01K 15/02; A01K 27/009; A01K 13/007; A61D 9/00; A01M 29/27
USPC ....... 119/822, 850, 712, 820, 908, 719, 856, 119/859, 174, 905, 814, 821; D30/144; 340/573.1, 573.3, 573.2; 604/289, 304, 604/308
See application file for complete search history.

(56) References Cited

U.S. PATENT DOCUMENTS

| | | | |
|---|---|---|---|
| 3,042,036 A | 7/1962 | Abadjieff | |
| 4,153,009 A | 5/1979 | Boyle | |
| 5,256,134 A | 10/1993 | Ingham | |
| 6,453,850 B1 | 9/2002 | Stampe | |
| 7,677,204 B1 * | 3/2010 | James | A01K 15/02 119/712 |
| 7,726,262 B2 * | 6/2010 | Stampe | A61D 9/00 119/850 |
| 8,011,328 B2 * | 9/2011 | Pitzen | A61D 9/00 119/859 |
| 8,061,307 B2 * | 11/2011 | Minick | A61D 9/00 119/822 |

(Continued)

*Primary Examiner* — Trinh T Nguyen
(74) *Attorney, Agent, or Firm* — Skinner and Assocs; Joel Skinner

(57) ABSTRACT

A lick deterrent device to deter animals from biting or chewing. The deterrent device has a flexible substrate physically conformable in three directions with conductive traces thereon. The lick deterrent device is configured for electrical connection to a removable power source. The traces are configured so that they may be contacted by an animal's tongue or saliva, so that upon contact, an electrical circuit is completed thereby delivering a mild electric shock to the animal. The lick deterrent device may be stretchable in at least one direction.

5 Claims, 7 Drawing Sheets

(56) References Cited

U.S. PATENT DOCUMENTS

2008/0190381 A1* 8/2008 Stampe .................... A61D 9/00
                                                                                           119/850

\* cited by examiner

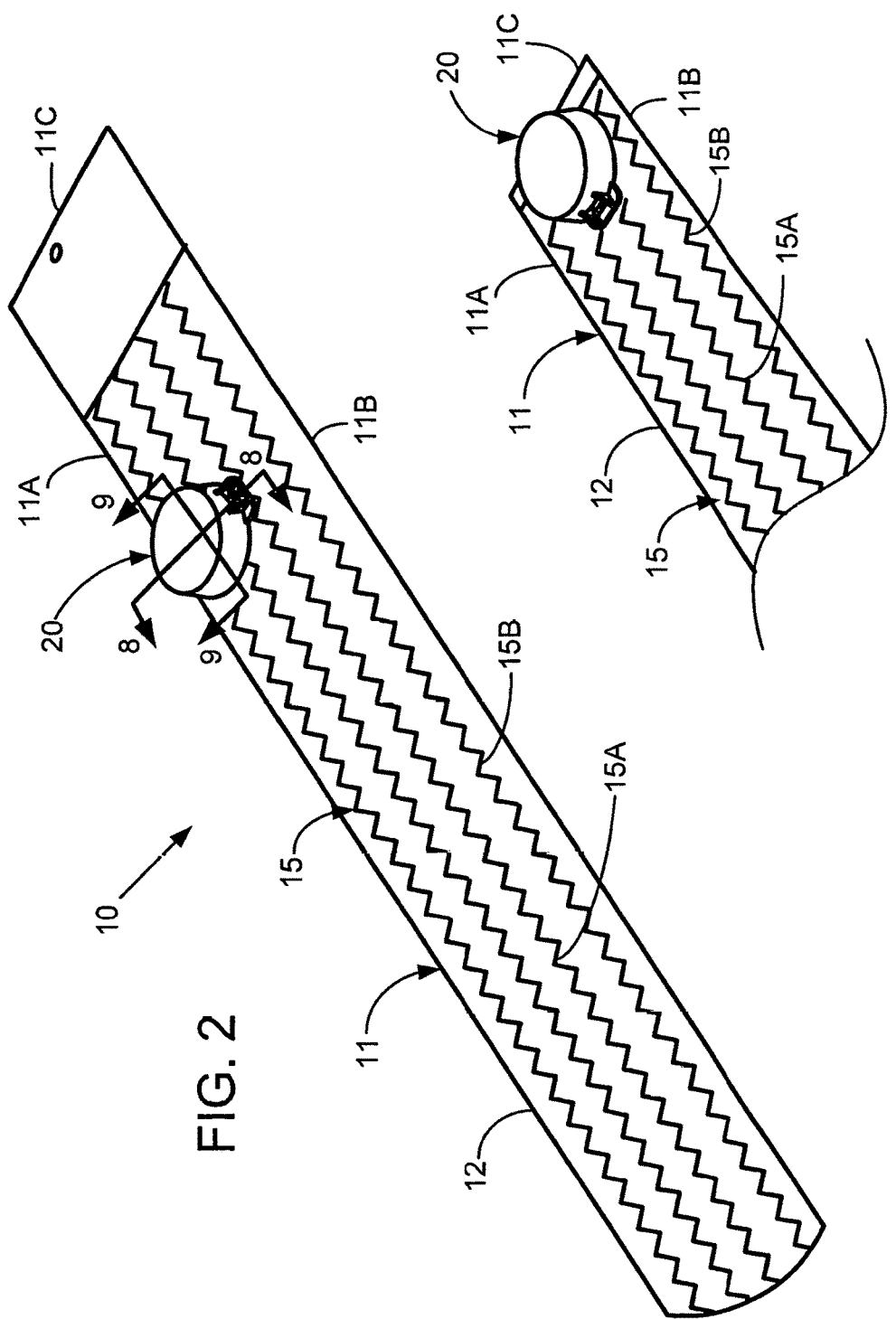

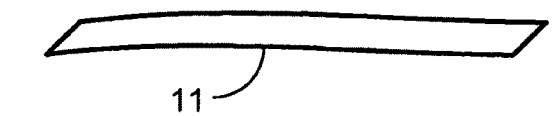
FIG. 3A
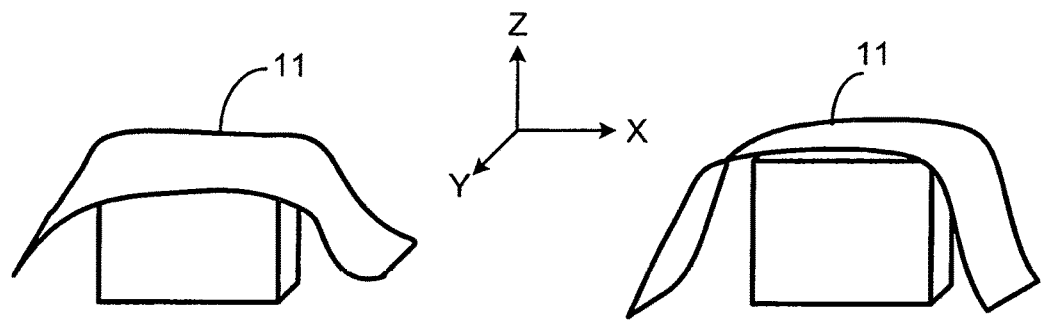
FIG. 3B
FIG. 3C
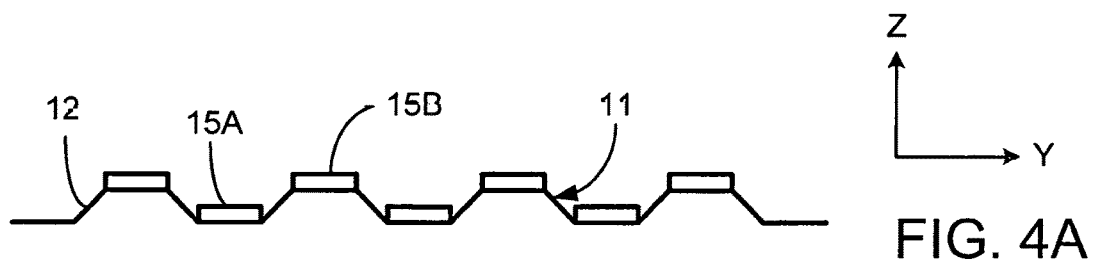
FIG. 4A
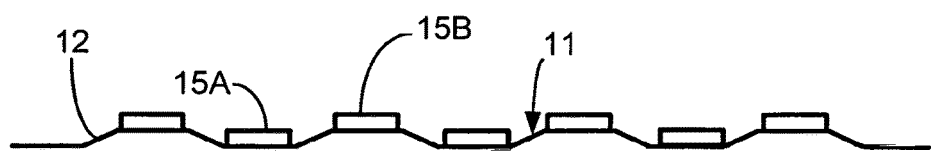
FIG. 4B

CONFORMABLE AND REUSABLE LICK DETERRENT

CROSS-REFERENCE TO RELATED APPLICATIONS, IF ANY

This application is a continuation of co-pending U.S. patent application Ser. No. 15/263,017, filed Nov. 29, 2016, which is a continuation of U.S. Pat. No. 9,504,232, issued Nov. 29, 2016, which is a divisional of U.S. Pat. No. 8,695,538 issued Apr. 15, 2014, which claims the benefit of U.S. Provisional Patent Application No. 61/147,793, filed Jan. 28, 2009, which is hereby incorporated by reference.

FIELD OF THE INVENTION

The present disclosure relates to electrically activated devices for deterring animals from licking or disturbing wounds and/or dressings.

BACKGROUND OF THE INVENTION

Various designs of lick deterrent devices have been designed for discouraging animals from licking their wounds or wound dressings. Many of the deterrent devices include a battery or other power source electrically connected to the lick deterrent device to provide a mild electrical shock to the animal when contact is made, for example, by the tongue of the animal. These lick deterrent devices are often applied by a veterinary or other medical person onto or over the area to be protected. After the wound has sufficiently healed, the lick deterrent device is removed and discarded. There is always room for improvement in the designs of lick deterrent devices and their deterrent modes.

BRIEF SUMMARY OF THE INVENTION

The present disclosure provides a lick deterrent device having a substrate with electrical traces thereon, the traces configured for electrical connection to a power source, such as a battery pack. The power source is readily attachable to and removable from the lick deterrent device. The lick deterrent device is readily conformable in three directions to allow the lick deterrent device to be securely applied (e.g., wrapped) on an area to be protected. Additionally, the lick deterrent device is stretchable in at least one direction, in some embodiments in at least two directions, and in other embodiments in three directions.

In some embodiments, the lick deterrent device is configured to be removed from the animal and reused at least a second time, optionally on a different animal. The lick deterrent device is cleansable and sterilizable. In most embodiments, a different power source is used for each use of the lick deterrent device.

A first particular embodiment of this disclosure is directed to an electrically actuated lick deterrent device that has a flexible and conformable substrate with first side surface and an opposite second side surface. The substrate is readily conformable in three directions. A first conductive trace and a second conductive trace are both on the first side surface of the substrate, the second trace electrically insulated from the first trace. Each of the first conductive trace and the second conductive trace may be water insoluble and alcohol insoluble. The reusable lick deterrent device is configured for electrical connection and reconnection to a power source.

A second particular embodiment of this disclosure is directed to a method of using a lick deterrent device. The method includes applying a lick deterrent device to a first area to be protected, the lick deterrent device comprising a substrate with a first conductive trace and a second conductive trace, the applying being done by conforming the substrate and the traces to the topography of the first area, and electrically connecting a first power source to the lick deterrent device. After use, the lick deterrent device and the first power source are removed from the first area to be protected. In some embodiments, after removing from the first area, the lick deterrent device is applied conformally to a second area to be protected. A second power source can be electrically connected to the lick deterrent device.

A third particular embodiment of this disclosure is directed to a method of using a reusable lick deterrent device. The method includes applying a lick deterrent device to a first area to be protected, the lick deterrent device comprising a substrate with a first conductive trace and a second conductive trace, and electrically connecting a first power source to the lick deterrent device, then removing the lick deterrent device and the first power source from the first area to be protected. After removing from the first area, the method includes applying the lick deterrent device to a second area to be protected and electrically connecting a second power source to the lick deterrent device. In some embodiments, the method includes an additional step, between removing the lick deterrent device and the first power source from the first area and applying the lick deterrent device to a second area; this additional step may be cleansing and/or sterilizing the lick deterrent device. The method may be repeated several times (e.g., two times, three times, five times, etc.), reusing the same lick deterrent device, yet preferably using a new power source each time.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which:

FIG. 2 is a perspective view of a lick deterrent device and battery pack according to this disclosure; FIG. 2A is an alternate embodiment of the lick deterrent device of FIG. 2;

FIG. 3A is a perspective view of a substrate; FIG. 3B is a perspective view of the substrate conformed in three directions; FIG. 3C is a perspective view of the substrate stretched in a direction;

FIGS. 4A and 4B illustrate a substrate and circuitry stretchable in a direction;

DETAILED DESCRIPTION OF THE INVENTION

Figure 1:
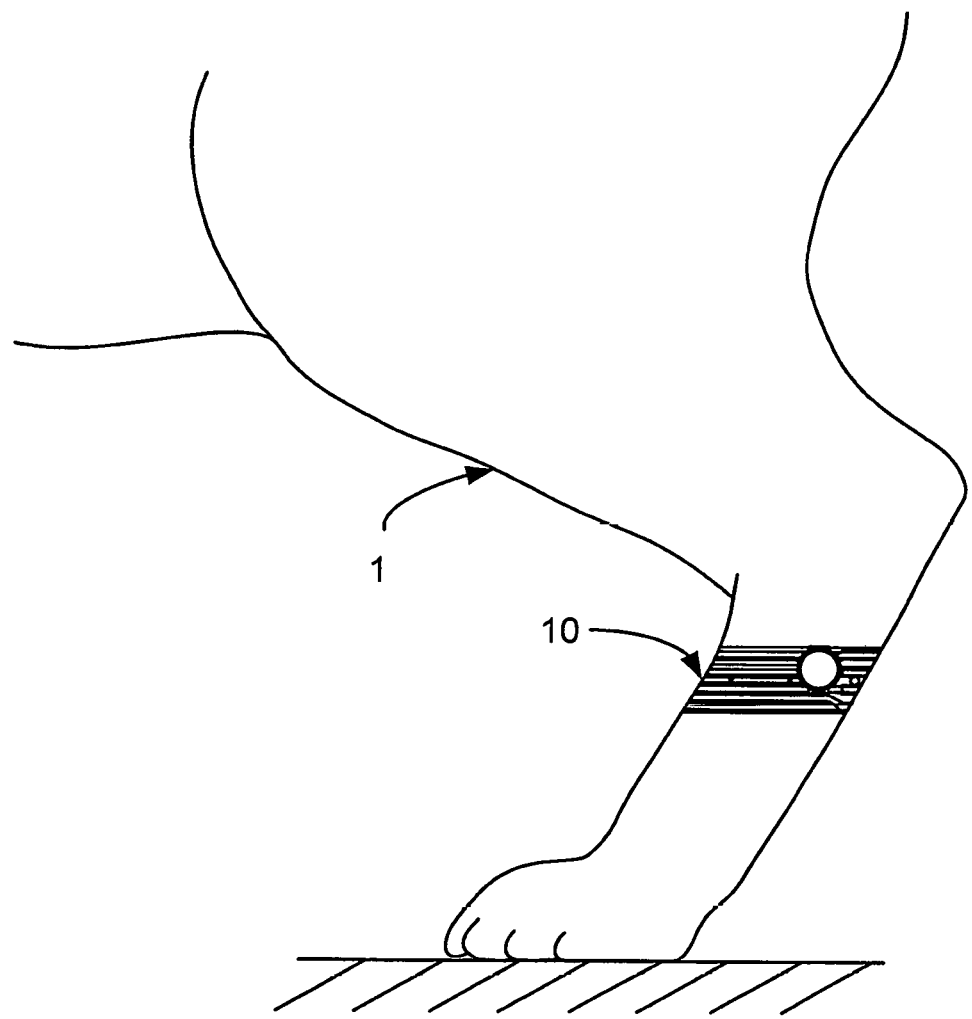
FIG. 1 is a partial side view of the body of a pet, having a lick deterrent device secured to the leg.

The following description is directed to various embodiments of lick deterrent devices to deter animals from biting or chewing. The deterrent device has a flexible substrate physically conformable in three directions with conductive traces thereon and is configured for electrical connection to a removable power source. The traces are configured so that they may be contacted by an animal's tongue or saliva, so that upon contact, an electrical circuit is completed thereby delivering a mild electric shock to the animal. The lick deterrent device may be stretchable in at least one direction.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense. Any definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The present disclosure relates to apparatuses for deterring animals from licking or otherwise disturbing protected areas, generally areas of their own body. In most embodiments, the deterrent device is attached to the animal's body over or proximate a wound or dressing. The lick deterrent device is a self-contained, relatively flat or planar device with a battery or other power source attached thereto to provide sufficient energy to the device to inhibit the animal from contacting the device. The device is readily conformable in three directions to allow the lick deterrent device to be securely applied (e.g., wrapped) on an area to be protected. In some embodiments, the device is stretchable in at least one direction. The lick deterrent device is sufficiently conformable to allow the device to be wrapped or otherwise applied to or around a desired surface to be protected, such as an animal's knee, leg, ankle, of the like. The device may be elastic, and return to its original shape after being conformed and/or stretched. Because the lick deterrent device is conformable and optionally stretchable, the device is particularly conducive to application to joints and other body parts that have a large range of motion (e.g., around the torso proximate the lungs).

By use of the phrase "conformable in three directions", "conformable in three dimensions" and the like, it is intended that the lick deterrent device is flexible in each of its three directions (i.e., length, width and thickness directions). The device can be formed to follow a desired shape by altering its form in at least one direction, as needed, in order to conform to the desired shape. In some embodiments, "conformable" is also stretchable.

After the wound has sufficiently healed or the animal has learned not to disturb the area being protected, the lick deterrent device is removed. In some embodiments, the lick deterrent device of this disclosure is readily removable and reusable for at least a second time. In most embodiments, the lick deterrent device can be reused at least 2 times (thus, the lick deterrent device being used at least 3 times), and preferably reused at least 5 times (thus, being used at least 6 times).

By use of the terms "reused", "reusable" and the like, it is intended that the lick deterrent device is applied to a first area (e.g., wound site) and is configured for electrical activation, the lick deterrent device is removed from the first area, and the same lick deterrent device is applied to a second area (e.g., wound site) and is configured for electrical activation. At both the first and second areas the lick deterrent is suitable for connection to a power source or battery pack and is suitable to provide a contact-deterring mild shock. The second area may be on a different animal than the first area. Alternately, the second area may be on the same animal as the first area, but at a different location. Still alternately, the second area may be the same area as the first area on the same animal, with the second application of the lick deterrent device being immediate (e.g., after a check of the healing of the wound) or may be delayed (e.g., weeks or months later, as with a chronic wound). In all embodiments of reusable devices, the lick deterrent device itself is reused. It is not necessary that the power source or battery pack is reused, but rather, in some embodiments it is desired that a new power source or battery pack is electrically attached for every used of the lick deterrent device.

FIG. 1 illustrates a portion of a pet 1, specifically a dog, having a lick deterrent device 10 attached to a hind leg. Device 10 at least partially wraps the leg, protecting an area beneath or proximate device 10 from the pet's licking or other tampering. Although lick deterrent device 10 is illustrated on a hind leg of pet 1, it is understood that lick deterrent device 10 could be positioned on other areas of pet 1, such as a front leg, paw, tail, torso, or the like. It is not necessary that lick deterrent device 10 encircles an appendage or other part of pet 1, but rather, lick deterrent device 10 could be applied as a patch on an area, such as the torso.

Lick deterrent device 10 is an electrically actuated device that inhibits pet 1 from licking itself proximate device 10 (and also inhibits others from licking proximate device 10) by providing a mild electrical shock to the licking animal when contact is made with device 10. The discomfort is usually sufficient to inhibit future contact with device 10.

Device 10 may be adhesively attached to the skin, hair or fur of pet 1, for example, by a water soluble or solvent-based adhesive that is non-toxic to the pet. Alternately, device 10 may be encircled and connected to itself, for example, by a mechanical connection (e.g., hook and loop or a clip) or adhesive.

FIGS. 2 and 2A illustrate lick deterrent device 10 having a power source such as battery pack 20 electrically connected thereto to provide energy to device 10 to produce the desired mild shock; additional details regarding battery pack 20 are below. Lick deterrent device 10 has an elongate flexible substrate 11 having a first side or surface 12 and an opposite second side or surface 14 (see FIGS. 8 and 9) with opposite side edges 11A and 11B and end edge 11C. Substrate 11 is preferably a rectangular strip with surfaces 12, 14 being generally flat. Side edges 11A, 11B are preferably parallel and linear, although other designs could be used. End edge 11C is typically orthogonal to side edges 11A, 11B.

Substrate 11 of lick deterrent device 10 is a flexible, conformable non-conductive substrate that is tear resistant and resilient to withstand multiple occurrences of flexing or bending. Substrate 11 is a material that is at least water resistant and preferably is waterproof, to facilitate cleansing of device 10 between uses of device 10. It is preferably resistant to soap and cleansers. Substrate 11 should also withstand medicaments, including petroleum based products and lanolin based products, without reacting with those products or degrading either those products or substrate 11. Substrate 11 must not interfere with or dilute any active ingredients in medicaments. In some embodiments, substrate 11 has a softening point greater than about 130° C., and in some of these embodiments, substrate 11 has a melting point greater than about 130° C.

Electrical circuitry 15 is present on first side or surface 12 of substrate 11. Circuitry 15 has a plurality of conductive traces, first traces (e.g., anode traces) 15A and second traces (e.g., cathode traces) 15B, electrically insulated (and typically spaced) from each other and extending generally the length of substrate 11. Second side or surface 14 has preferably no conducting material thereon, and is preferably electrically insulating. Traces 15A, 15B of circuitry 15 are electrically conducting stripes present at the surface of substrate 11. In some embodiments, traces 15A, 15B may be present on the surface of substrate 11 (e.g., coated or plated onto substrate 11) or may be partially embedded into substrate 11. In other embodiments, traces 15A, 15B may be provided on a separate carrier layer that is applied onto substrate 11.

The conductive material that forms traces 15A, 15B may be provided, for example, as threads, wires, or particles of conductive material present on surface 12 of substrate 11 or incorporated into substrate 11 proximate surface 12. The conductive thread may be a monofilament, a plurality of conductive filaments, or may be fibers, filaments or particles of conductive material twisted with nonconductive material (e.g., polymer or natural fiber) to form an overall conductive thread. Threads, fibers, wires and the like may be woven, knitted, or otherwise incorporated into substrate 11 proximate surface 12. Particles may be coated or printed from a slurry or dispersion. Alternately, the conductive material may be deposited (e.g., by chemical vapor deposition) or plated.

Examples of suitable electrically conductive material include carbon (e.g., carbon black, graphite), stainless steel, copper, silver, gold, titanium, platinum, palladium, and various combinations thereof, such as silver-impregnated carbon, silver and chloride mixtures (e.g., Ag/AgCl). Traces 15A, 15B may be designed to control and/or limit the current flow therethrough, for example, so that pet 1 does not receive too large of a shock or to inhibit the device from shorting. In preferred embodiments, traces 15A, 15B have a resistivity of about 500-50,000 ohms. Traces 15A, 15B are water insoluble and preferably alcohol insoluble. Traces 15A, 15B should also withstand medicaments, including petroleum based products and lanolin based products, without reacting with or degrading. Traces 15A, 15B must not interfere with or dilute any active ingredients in medicaments.

Substrate 11 and circuitry 15 (i.e., traces 15A, 15B), together, are conformable in at least three directions, to allow substrate 11 and circuitry 15 to be, for example, wrapped around a joint of an animal. In some embodiments, substrate 11 and circuitry 15 are stretchable in at least one direction, in some embodiments in two directions.

Substrate 11 may be, for example, a substrate of polymeric or natural materials that has sufficient flexibility so that substrate 11 is readily conformable in three directions. Examples of suitable substrates include fabrics or cloth-like materials that are woven (including gauze-like), knitted, crocheted, or the like. Lofty nonwoven or spun-bonded fabrics or cloth-like materials are also suitable, and may have an incorporated supporting structure. Each of these substrates is typically formed of a plurality of fibers or filaments, either polymeric (e.g., nylon, polyester, polypropylene, etc.) or natural (e.g., cotton, wool, etc.). Additional examples of suitable substrates include films or nonwoven materials, for example, of polyester, polypropylene, and the like. Rubber substrates, either as fabrics, cloth-like substrates or as films, are also suitable substrates for the lick deterrent devices of this disclosure.

Substrates 11 that are stretchable in at least one direction (generally the longer, length direction) are preferred for some embodiments. Stretchable substrates may have an elastic memory, to at least partially return to its pre-stretched state. Knitted and crocheted materials are particularly suited for being stretchable in at least one direction, because of their internal (e.g., looped) structure. Rubber materials, either as films or fibrous substrates, are also suitable for being stretchable in at least one direction.

One general type of particularly suitable material for substrate 11 includes that known as cohesive flexible wrap or self adherent wrap. Examples are described, for example, in U.S. Pat. No. 4,984,584 (Hansen et al.) and U.S. Pat. No. 5,503,908 (Faass), both of which are incorporated herein by reference. These flexible wraps are typically nonwoven elastic composite materials that have a high elastic modulus. Another general type of particularly suitable material for substrate 11 includes that known as athletic or sports bandages (e.g., ACE® brand bandages).

FIGS. 3A through 3C illustrate a substrate 11 being conformed in three directions and stretched in one direction. FIG. 3A illustrates substrate 11, in a fairly planar position. In FIG. 3B, substrate 11 is illustrated conformed around an object (i.e., a box) in each of the X-, Y-, and Z-directions. Substrate 11 drapes down, in the Z-direction, along its length (which extends in the X-direction) and its width (which extends in the Y-direction) around the object. In this illustrated embodiment, substrate 11 is not conformed tight against the object; in use, however, the lick deterrent device will typically conform tightly to the area of application. In FIG. 3C, substrate 11 is illustrated having been stretched in its X-direction, so as to completely cover the object in that direction. In FIG. 3C, substrate 11 also conforms to the object in the X- and Z-directions.

In FIGS. 4A and 4B, substrate 11 is illustrated stretched in its width or Y-direction. In these figures, substrate 11 has traces 15A, 15B alternating on various elevations (e.g., peaks and valleys) of surface 12 of substrate 11. When substrate 11 is stretched across its width (in the Y-direction), as in FIG. 4B, the peaks and valleys of substrate 11 collapse, allowing stretching of substrate 11 in the Y-direction and conformation in at least the Z-direction.

Figure 5A:
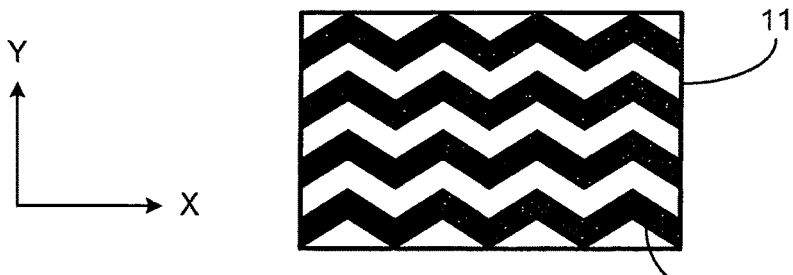
FIGS. 5A and 5B illustrate a second substrate and circuitry stretchable in a direction.
Figure 5B:
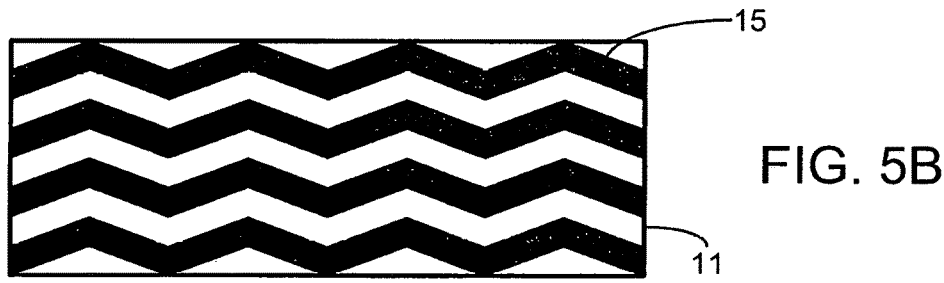
Figure 6A:
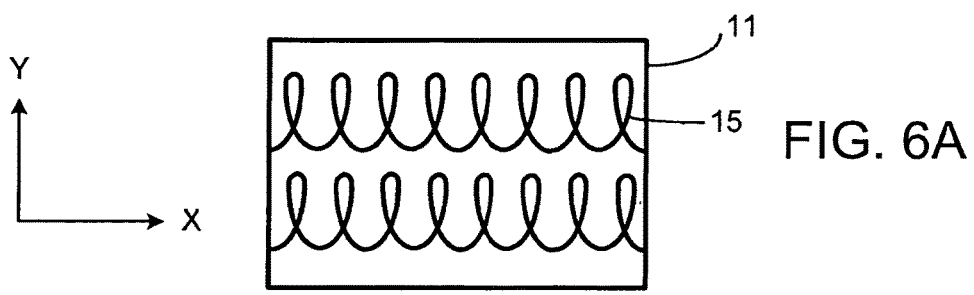
FIGS. 6A and 6B illustrate a third substrate and circuitry stretchable in a direction.
Figure 6B:
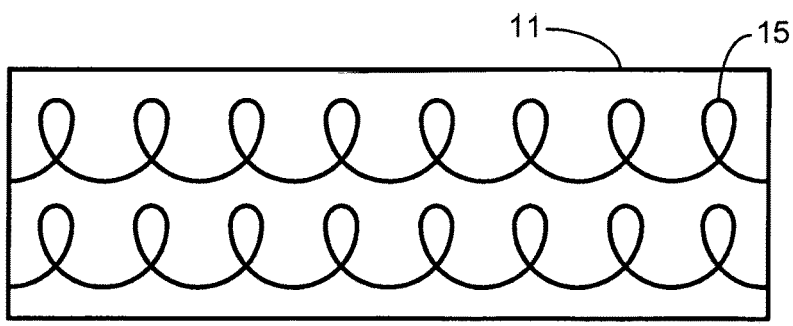

Circuitry 15 (i.e., traces 15A, 15B), present on surface 12 of substrate 11, is also conformable in three directions and preferably stretchable in at least one direction. FIGS. 5A, 5B, 6A and 6B illustrate two examples of the substrate and circuitry being stretchable in the X-direction and FIGS. 5A and 5B illustrate an example of the substrate and circuitry being stretchable in the Y-direction. In FIG. 5A substrate 11 has a circuitry 15 having a zig zag or chevron pattern that extends the length (in the X-direction) of substrate 11. When substrate 11 is stretched, as in FIG. 5B, circuitry 15 also stretches. In this embodiment, the angles of the zig zag increase, allowing circuitry 15 to extend in length. In FIG. 6A substrate 11 has a circuitry 15 having a looped pattern that extends the length (in the X-direction) of substrate 11. When substrate 11 is stretched, as in FIG. 6B, circuitry 15 also stretches. In this embodiment, the distance between loops and the internal loop diameter increases, allowing circuitry 15 to extend in length. Other patterns of circuitry that extend in length may also be used for the lick deterrent devices of this disclosure. Typically, any non-linear pattern should be acceptable.

Figure 7A:
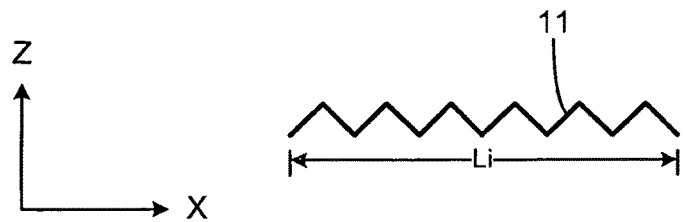
FIGS. 7A and 7B illustrate a lick deterrent device stretchable in a direction.
Figure 7B:
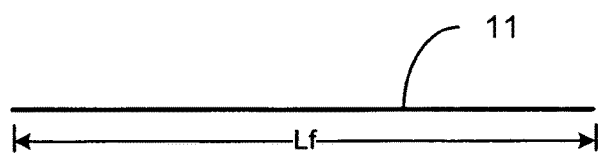

FIGS. 7A and 7B illustrate an example of the overall device being stretchable in the X-direction. In FIG. 7A, substrate 11 has a circuitry (not illustrated) thereon. Substrate 11 and its circuitry are folded, e.g., in an accordion manner, or otherwise physically manipulated to provide a device having a length Li (length initial). In this embodiment, the device is folded to increase its Z-dimension. When the device is stretched, as in FIG. 7B, the angles of the folds increase and its Z-dimension decreases, so that device elongates to have a length Lf (length final).

Various embodiments of lick deterrent devices, having a substrate and circuitry that is conformable in three directions and preferably stretchable in at least one direction have been illustrated and discussed above. In each of the embodiments of conformable and optionally stretchable lick deterrent devices, traces 15A, 15B are electrically insulated from each other at all times; that is, traces 15A, 15B do not contact each other, as contact will short the circuit and lick deterrent device 10 will be (at least temporarily) inoperable.

Figure 12:
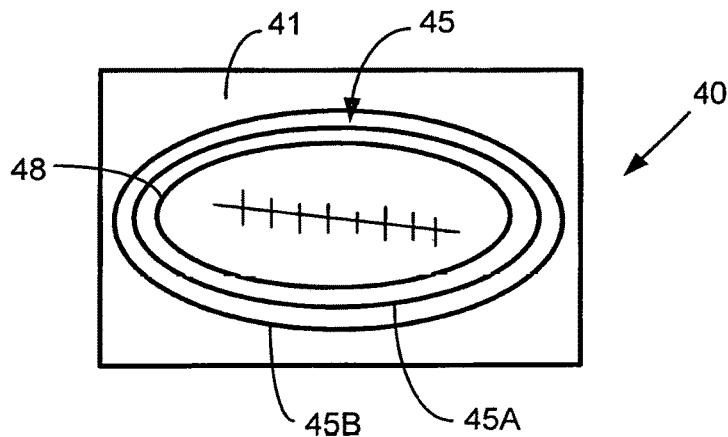
FIG. 12 is a top view of a lick deterrent device that encompasses the area to be protected.
Figure 13:
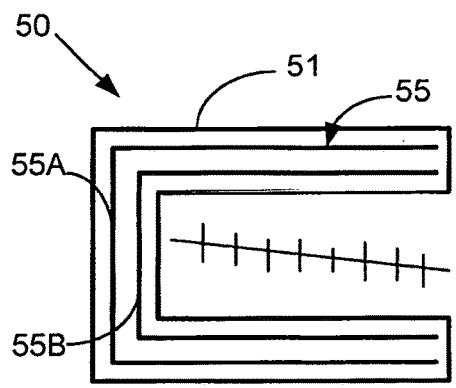
FIG. 13 is a top view of a lick deterrent device that at least partially encompasses the area to be protected.
Figure 14:
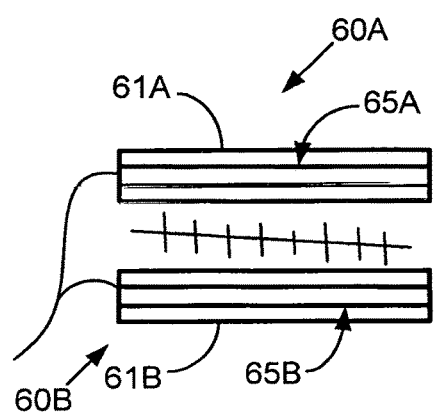
FIG. 14 is a top view of another embodiment of a lick deterrent device that at least partially encompasses the area to be protected.

FIGS. 12, 13 and 14 illustrate three additional embodiments of lick deterrent devices, which are conformable in three directions and may or may not be stretchable in a direction.

Lick deterrent device 40 of FIG. 12 has a substrate 41 with circuitry 45 (having at least two electrically insulated traces 45A, 45B) thereon. Device 40 is shaped and configured to encompass an area to be protected, such as a surgical site, without extending over the area to be protected. In this embodiment, substrate 41 is generally annular, with an oval or elliptical aperture 48 therein. Device 40 is held around the area to be protected by an adhesive on the back side of substrate 41. In FIG. 12, a surgical site having an incision and stitches or staples is illustrated.

Lick deterrent device 40 of FIG. 12 has a substrate 41 with circuitry 45 (having at least two electrically insulated traces 45A, 45B) thereon. Device 40 is shaped and configured to encompass an area to be protected, such as a surgical site, without extending over the area to be protected. In this embodiment, substrate 41 has an oval or elliptical aperture 48 therein. Device 40 is held around the area to be protected by an adhesive on the back side of substrate 41. In FIG. 12, a surgical site having an incision and stitches or staples is illustrated.

Lick deterrent device 50 of FIG. 13 has a substrate 51 with circuitry 55 (having at least two electrically insulated traces 55A, 55B) thereon. Device 50 is shaped and configured to at least partially encompass an area to be protected, such as a surgical site, without extending over the area to be protected. In this embodiment, substrate 51 has three arms, or, two arms extending from a base, that encompass the area to be protected on three sides. Device 50 is held around the area to be protected by an adhesive on the back side of substrate 51. In FIG. 13, a surgical site having an incision and stitches or staples is illustrated.

The lick deterrent device of FIG. 14 is composed of two individual devices 60A and 60B. Each device 60A, 60B has a substrate 61A, 61B with circuitry 65A, 65B (having at least two electrically insulated traces) thereon. The device is shaped and configured to at least partially encompass an area to be protected, such as a surgical site, without extending over the area to be protected. Device 60A and device 60B are on opposite sides of the area to be protected, in this embodiment, substantially parallel to each other. In the illustrated embodiment, devices 60A, 60B are electrically connected together, so as to be activated by the same power source. Devices 60A, 60B are held around the area to be protected by an adhesive on the back side. In FIG. 14, a surgical site having an incision and stitches or staples is illustrated.

It is understood that other shapes and configurations of conformable lick deterrent devices could be used.

To activate lick deterrent device 10, 40, 50, etc., a power source is electrically connected to traces 15A, 15B, 45A, 45B, 55A, 55B, etc. A power source such as battery pack 20 provides electrical connection to each of first traces 15A, 45A, 55A, etc. and second traces 15B, 45B, 55B, etc. so that upon electrical connection between first traces 15A, 45A, 55A, etc. and second traces 15B, 45B, 55B, etc. (for example, by contact by the animal's tongue), the electrical circuit is completed and electricity flows through the circuit. Orthogonally oriented cross-sectional views of battery pack 20 mounted on substrate 11 are illustrated in FIGS. 5 and 6, and detailed figures of battery pack 20 are illustrated in FIGS. 8 and 9.

Battery pack 20 is one preferred embodiment of a power source for use with lick deterrent device 10. Battery pack 20 has a top housing 22 defining an interior chamber 23 for receiving a battery therein. Top housing 22 is configured to sit on first side or surface 12 of substrate 11, proximate circuitry 15. Battery pack 20 also includes a lower housing portion 24, configured to be on the opposite side of substrate 11 (i.e., on second side or surface 14). Together, top housing 22 and lower housing portion 24 provide a case for receiving the battery therein. Top housing 22 and lower housing portion 24 are hingedly connected by a living hinge 25. Top housing 22 and lower housing portion 24 can be releasably engaged via latch 26 to gain access to interior chamber 23. Top housing 22 has a first portion 26A of latch 26 and lower housing portion 24 has second portion 26B of latch 26; portions 26A, 26B engage to hold top housing 22 and lower housing 24 together. In FIG. 8 battery pack 20 is readily seen attached to substrate 11, with top housing 22 on first side or surface 12 and lower housing portion 24 on second side or surface 14, with hinge 25 at side edge 11A. Battery pack 20 may be positioned proximate any of side edge 11A, side edge 11B or end edge 11C. FIG. 2A illustrates battery pack 20 attached to substrate 11 at end edge 11C.

Lower housing portion 24 includes a moveable flap 28 integral with portion 24. Flap 28 is readily moveable into and away from interior chamber 23 when lower housing portion 24 is engaged with top housing 22 to form an enclosure. Flap 28 has an inherent spring constant based on the material of lower housing portion 24 and the physical configuration of flap 28. On flap 28 is a protrusion 29 that extends toward second side or surface 14 of substrate 11 when battery pack 20 is engaged with substrate 11.

Figure 8:
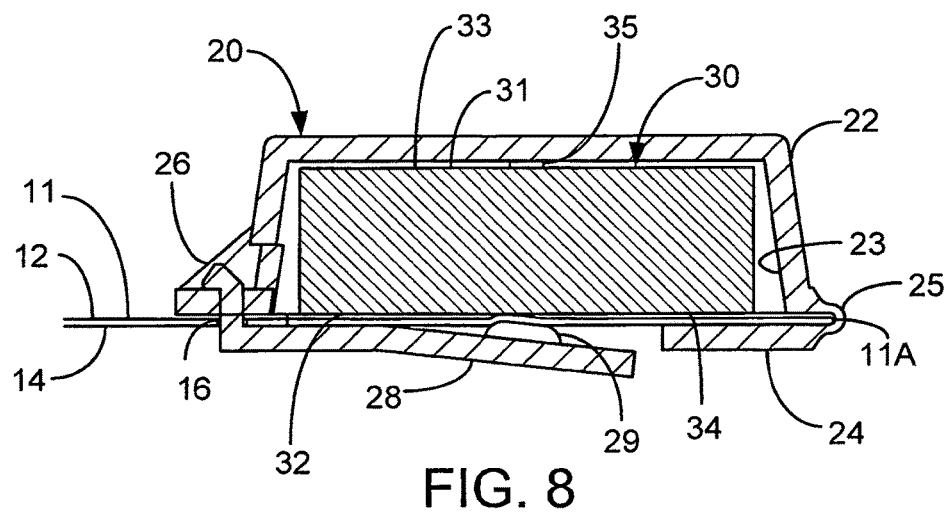
FIG. 8 is a cross-sectional view of the lick deterrent device and battery pack taken along line 8-8 of FIG. 2.
Figure 9:
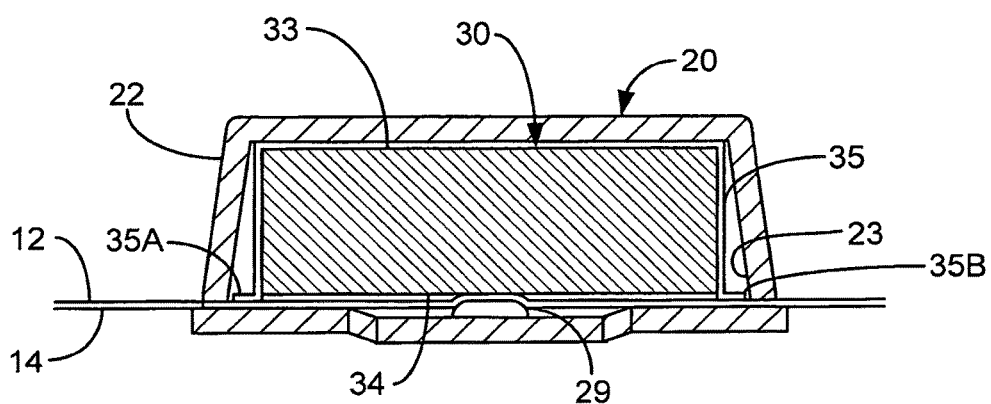
FIG. 9 is a cross-sectional view of the lick deterrent device and battery pack taken along line 9-9 of FIG. 2.
Figure 10:
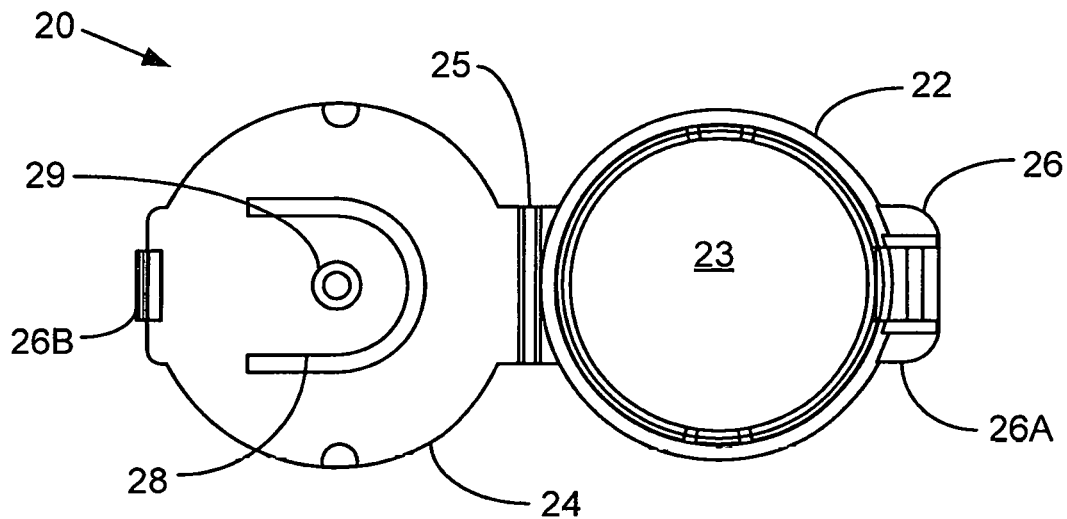
FIG. 10 is a top view wire frame of the battery case of FIG. 2.
Figure 11:
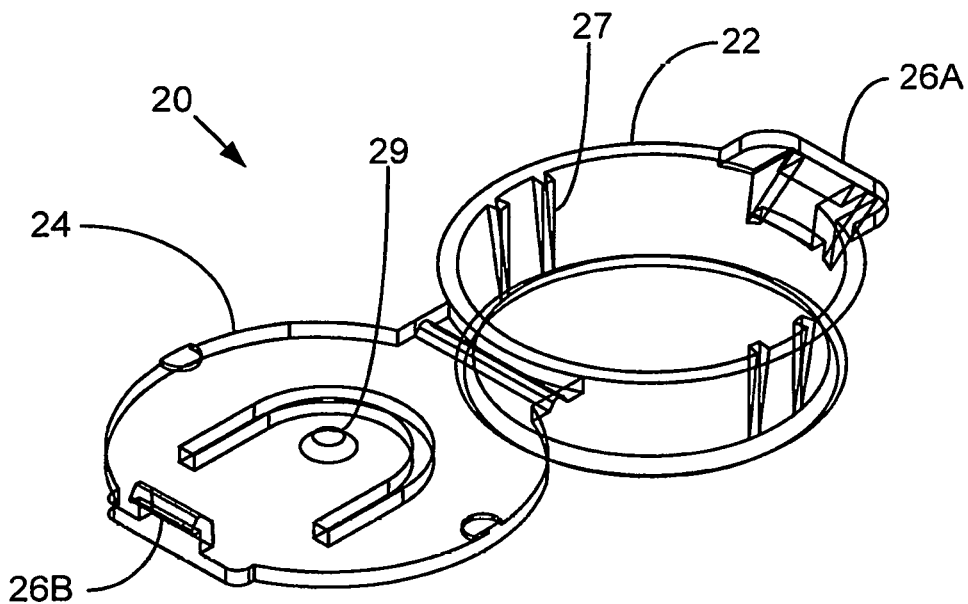
FIG. 11 is an isometric view wire frame of the battery case of FIG. 2.

Illustrated in FIGS. 8 and 9 within interior 23 of battery pack 20 is a battery 30, such as a button battery. It should be understood that a "battery" may be one or more battery cells electrically connected in series. Battery 30 has a first side 31 and an opposite second side 32 opposite first side 31. Present on first side 31 is a first terminal 33 (e.g., the anode) and present on second side 32 is a second terminal 34 (e.g., the cathode). To obtain electrical contact with both first terminal 33 and second terminal 34 on the same side of battery 30, a terminal extension 35 is electrically connected to first terminal 33 of battery 30 and extends toward second terminal 34 without contacting second terminal 34. See FIG. 9, where terminal extension 35 is composed of two legs of electrically conducting material. Terminal extension 35 may be permanently attached to battery 30 or to top housing 22 or may be removably positioned in relation to battery 30. Upon placing battery 30 into housing 22, extension 35 contacts first terminal 33. Terminal extension 35 has ends 35A, 35B that contact first side or surface 12 of substrate 11 when top housing 22 is fitted against substrate 11. In FIGS. 10 and 11, top housing 22 includes guides 27 for maintaining the position of terminal extension 35.

In use, battery pack 20 is electrically connected to substrate 11 and attached to an animal, as illustrated in FIG. 1. In order to properly function and provide a mild shock to prevent future contact with lick deterrent device 10 by the animal, both terminals 33, 34 of battery 30 need to contact circuitry 15, for example, terminal 33 needs to contact traces 15A and terminal 34 needs to contact traces 15B.

To electrically attach battery pack 20 to lick deterrent device 10, as shown in FIGS. 1, 2 and 2A, battery pack 20 is positioned with top housing 22 on first side or surface 12 and with lower housing portion 24 on second side or surface 14. In most embodiments, hinge 25, the connection between top housing 22 and lower housing portion 24, is positioned adjacent an edge of substrate 11, e.g., end edge 11C (see FIG. 2A) or side edge 11A (see FIG. 8). In the embodiment of FIG. 8, latch portion 26B is passed through aperture 16 in substrate 11, and latch portion 26B is engaged with latch portion 26A to close lower housing portion 24 with top housing 22 and form interior chamber 23 for retaining battery 30 therein. Battery 30 may be a permanent fixture of battery pack 20 or may be placed within interior chamber 23 before or after passing latch portion 26B through substrate 11, but definitely before engaging latch portion 26B with latch portion 26A.

With latch 26 closed, protrusion 29 on flap 28 provides sufficient pressure against second side or surface 14 of substrate 11 to provide direct electrical contact between one of traces 15A or 15B on surface 12 with second terminal 34 of battery 30. Simultaneously, at least one of terminal extension ends 35A, 35B, which are electrically connected to first terminal 33 of battery 30, electrically contacts the other of traces 15A, 15B. Battery pack 20 may be adjusted after placement on substrate 11 to ensure good contact with traces 15A and 15B.

When desired, lick deterrent device 10 and battery pack 20 are removed from the pet, typically by opening or unsealing the mechanism that retains device 10 onto the pet. In some embodiments, the wound or area is inspected, and lick deterrent device 10 is reapplied to the same urea, for example, after cleansing the wound. In other embodiments, the wound or area is inspected and is deemed sufficiently healed. Lick deterrent device 10 can be washed, preferably with a cleanser or antibacterial soap and optionally sterilized, and stored until again needed. For the next application, a new battery pack 20 is installed, and lick deterrent device 10 is applied to the next pet.

Various other embodiments of battery packs for use with lick deterrent device 10 are described in Applicant's co-pending U.S. patent application Ser. No. 12/274,783 (Pitzen) filed Nov. 20, 2008, the entire disclosure of which is incorporated herein. Battery packs suitable for use with lick deterrent device 10 may have a first portion on the first side of substrate 11 and a second portion on the second side of substrate 11 and be held onto substrate 11 by mechanical engagement of the two portions, as is battery pack 20 of FIGS. 2 and 8 through 11 herein. Some battery packs may have a first portion and a second portion, both of which are on the first side of substrate 11. For example, a battery pack for a 9 volt battery may be present on only one side of substrate 11. Single portion battery packs, held onto substrate 11 by mechanisms such as adhesive, solder, welding, or the like are also suitable for use with lick deterrent device 10. Battery pack embodiments may be permanently attached or affixed to substrate 11 or may be removable and replaceable; in most embodiments, battery packs and other power sources are removable from lick deterrent device 10, to facilitate reuse of device 10.

Battery pack 20 (and any other battery pack used) includes at least one battery 30 electrically connected to circuitry 15. A suitable battery 30 is a button type battery having an output of at least about 3 volts, and in some embodiments, at least about 9 volts, depending on the size of the lick deterrent device and the animal for which it is intended. Batteries with 9-15 volts will typically produce a sufficiently unpleasant sensation that deters the animal from future contact with deterrent device 10. Battery 30 may be permanently attached within the battery pack itself (e.g., within top housing 22).

In some embodiments, the power source for lick deterrent device 10 may be positioned remote from substrate 11 and connected to circuitry 15 via extension wires or the like. Power sources other than DC batteries may be used. For example, with proper converters, AC sources may be used, as well as alternate sources of energy, such as solar power.

Thus, embodiments of the CONFORMABLE AND REUSABLE LICK DETERRENT are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of using an electronic device worn by an animal or human, comprising:
applying a device to a first area of the animal or human, the device comprising a flexible substrate having a first side surface and an opposite second side surface, the substrate being physically conformable in three directions, along its length, width and thickness, the substrate further being stretchable along its length (x) with a first conductive trace and a second conductive trace both on the first side surface of the substrate, the second trace electrically insulated from the first trace, the first and second conductive traces also being conformable in three directions and stretchable at least along their length, including conforming the device to the first area in the three directions; and electrically connecting a first power source to the device, the first power source including a battery pack connected to the substrate, the battery pack retaining a battery having an anode and a cathode, the battery pack retaining at least one of the anode or the cathode electrically against the first trace, and the battery pack including a terminal extension for connecting the other of the anode or the cathode to the second conductive trace.

2. The method of claim 1 wherein the step of applying the device further includes stretching the device.

3. The method of claim 2 wherein the step of stretching the device comprises stretching the substrate and the traces along the length of the substrate.

4. The method of claim 1 further comprising:

removing the device and the first power source from the first area; and after removing from the first area, applying the device to a second area and electrically connecting a second power source to the device.

5. The method of claim 4 further comprising, between removing the device and the first power source from the first area and applying the device to a second area and cleansing the device.

* * * * *